Dec. 2, 1930. J. H. FOX 1,783,465
FLUID COOLED ROLL
Filed Sept. 30, 1927 3 Sheets-Sheet 1
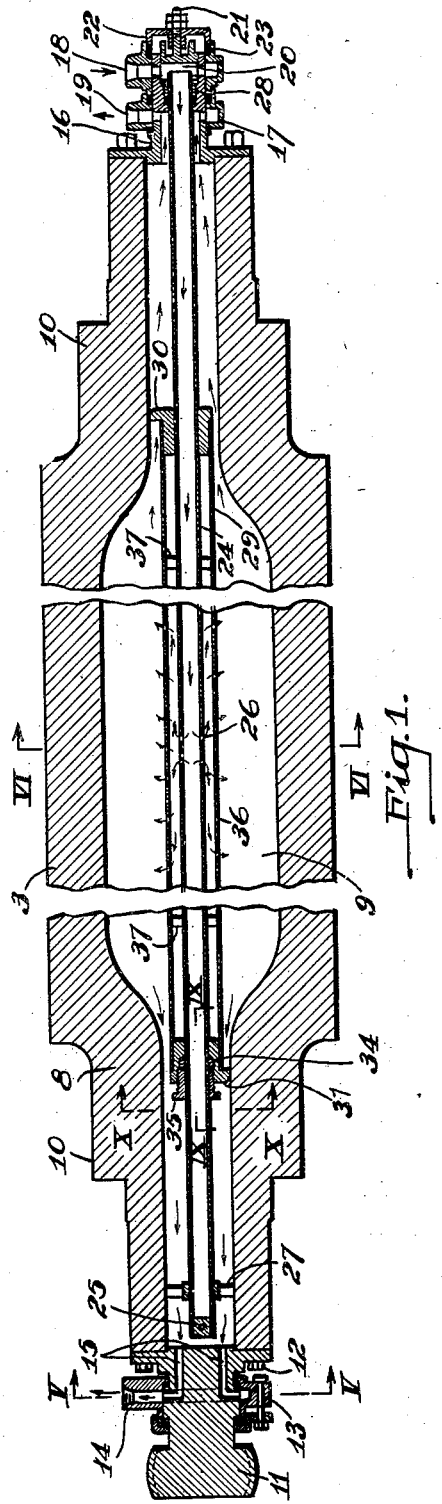
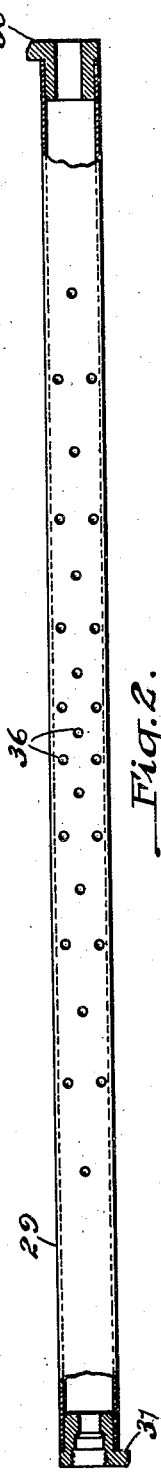
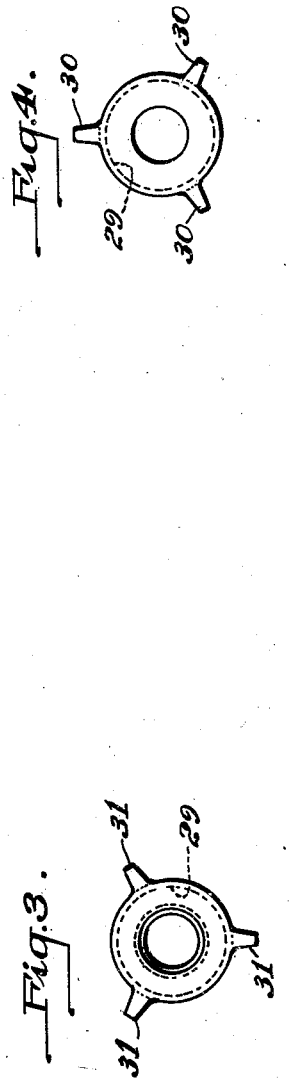
INVENTOR
John H. Fox
by James C. Bradley
atty Dec. 2, 1930.  J. H. FOX  1,783,465
FLUID COOLED ROLL
Filed Sept. 30, 1927   3 Sheets-Sheet 2

INVENTOR
John H. Fox
by
James C. Bradley
atty.

Dec. 2, 1930.  J. H. FOX  1,783,465
FLUID COOLED ROLL
Filed Sept. 30, 1927  3 Sheets-Sheet 3

INVENTOR
John H. Fox
by James L. Bradley
Atty.

Patented Dec. 2, 1930

1,783,465

UNITED STATES PATENT OFFICE

JOHN H. FOX, OF PITTSBURGH, PENNSYLVANIA, ASSIGNOR TO PITTSBURGH PLATE GLASS COMPANY, A CORPORATION OF PENNSYLVANIA

FLUID-COOLED ROLL

Application filed September 30, 1927. Serial No. 223,034.

Figure 5:
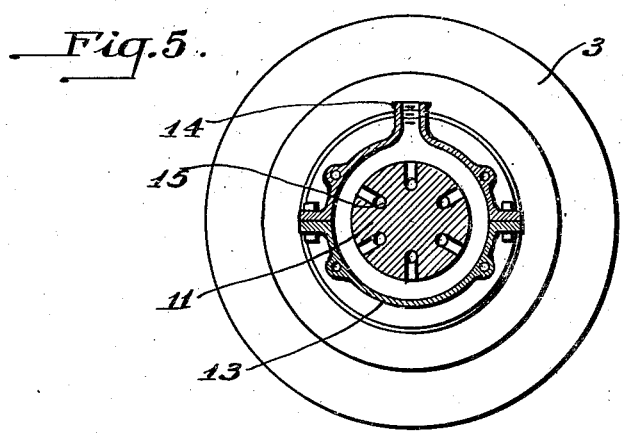
Figure 6:
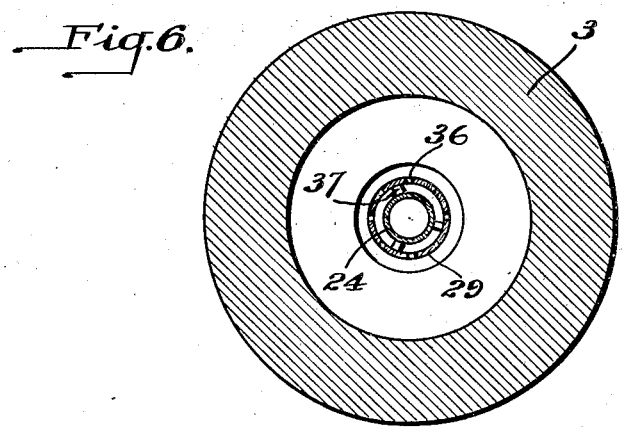
Figure 7:
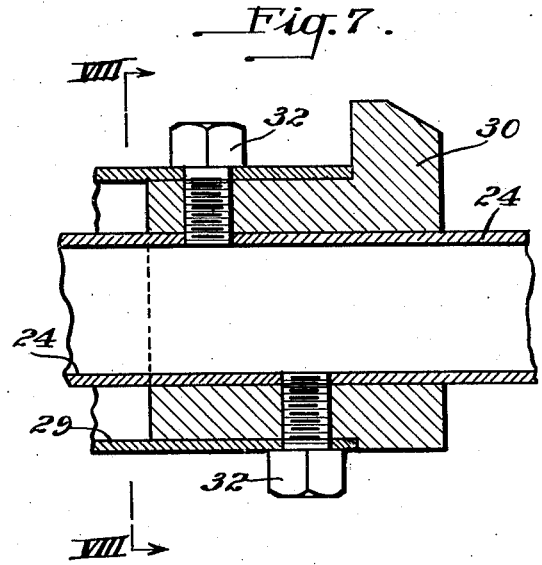
Figure 8:
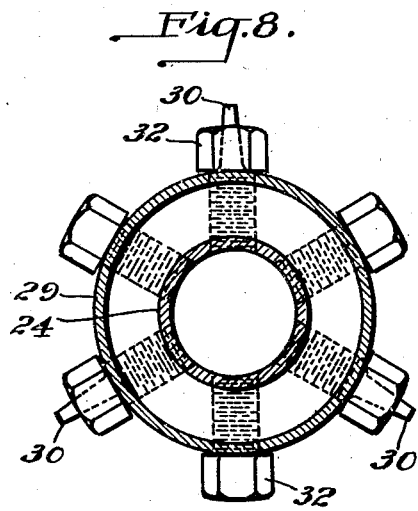
Figure 9:
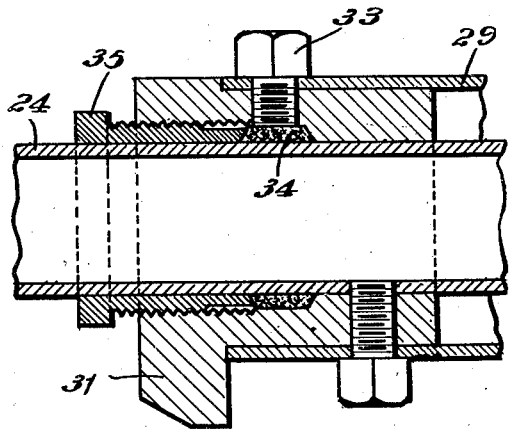
Figure 10:
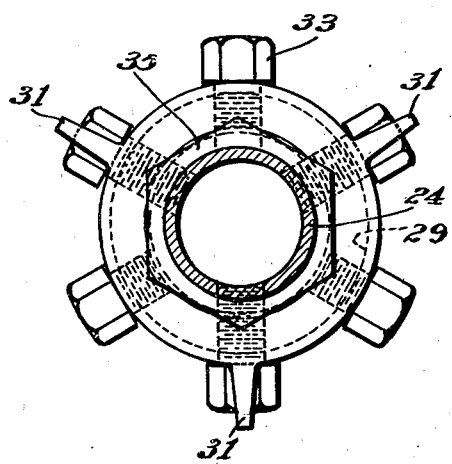

The invention relates to fluid cooled rolls for use in glass rolling apparatus, such as that shown in the patent to Frederick Gelstharp No. 1,560,079 of November 3, 1925, or the patent to Lee Showers No. 1,579,666 of April 6, 1926, although not limited to use in the particular apparatus of said patents. The invention has for its principal objects, the provision of a roll which will not warp under the severe heat conditions to which it is exposed; which has an improved arrangement for circulating and distributing the cooling fluid employed, so that the portion of the roll which comes in contact with the glass is uniformly cooled throughout its length, and in which improved means are provided for supporting the distributing pipes so that any sagging is avoided as well as any strain or buckling incident to contraction or expansion resulting from temperature changes. One embodiment of the invention is illustrated in the accompanying drawings, wherein:

Figure 1 is a longitudinal section through the roll. Fig. 2 is a side elevation of the distributing pipe employed with the ends thereof in section. Figs. 3 and 4 are end views of the distributing pipe. Figs. 5 and 6 are enlarged sections on the lines V—V and VI—VI respectively of Fig. 1. Fig. 7 is an enlarged section through the parts 24, 29 and 30. Fig. 8 is a section on the line VIII—VIII of Fig. 7. Fig. 9 is an enlarged section on the line IX—IX of Fig. 1, and Fig. 10 is a section on the line X—X of Fig. 1.

One of the difficulties encountered in a glass rolling operation is that of maintaining the roll 3 at a proper temperature. It must be adequately cooled and this cooling should be uniform from one end of the roll to the other in order to avoid any warping of the roll, as such warping introduces strains resulting in a rapid deterioration of the roll and further produces a sheet which is not of uniform thickness. The present invention is designed to provide a cooling arrangement which will give the necessary uniformity in cooling.

The roll comprises the casing 8, preferably of cast iron, having the central portion cored out or counterbored to provide the chamber 9. Bearing portions 10, 10, are provided at the ends of the roll for supporting it in suitable journals. One end is provided with the driving member 11 to which the tumbler for rotating the roll is connected, such member 11 being secured to the end of the roll by means of the bolts 12. Suitably mounted on the member 11 is the swivel 13 having the connection 14 which serves as an outlet for the cooling fluid, the swivel being in communication with the passages 15 leading to the chamber 9. The other end of the roll is provided with a cap 16 carrying the swivel 17, such swivel being provided with a pair of connections 18 and 19, the connection 18 constituting an inlet and the connection 19 an outlet. The end of the cap 16 is closed by means of the screw plug 20. This plug is provided with a threaded stem 21 extending through the gland member 22 engaging the packing 23 and this member is forced in by means of a nut carried upon the stem.

Extending through the casing from one end to the other is the liquid distributing pipe 24, whose left hand end is closed by the plug 25 and whose right hand end is open and in communication with the inlet 18. The pipe is provided at its central portion with the perforations 26 to permit of an outflow of the cooling fluid therethrough. The pipe is supported at its left hand end by means of the spider 27, which has its arms in engagement with the inner surface of the roll casing, so that the pipe 24 is held in central position in the casing, but is at the same time free to expand and contract under changes of temperature, thus avoiding any danger of buckling, such as might occur if the ends of the pipe were rigidly held against movement. The right hand end of the pipe is supported in the swivel by means of the gland 28 which engages suitable packing and prevents any leakage along the pipe between the inlet and outlet passages 18 and 19.

Surrounding the fluid supply pipe 24 is the distributing pipe 29, which is of less length than the pipe 24 and is supported upon the interior of the roll casing by means of the spiders 30 and 31. These spiders also engage and support the fluid supply pipe 24 intermediate its ends, so that any tendency of the pipe 24 to sag is avoided. This is important in a long roll as the sagging or warping of the pipe 24 tends to bring it closer to one side of the roll casing and thus interfere with the uniformity of the cooling effect of the liquid passing through the pipe. The spider 30 is anchored to the pipes 24 and 29, as indicated in Figs. 7 and 8, this being accomplished by the use of the six stud bolts 32 which extend through the two pipes and through the interposed collar forming a part of the spider. The spider 31 at the left hand end of the pipe 29 is secured to such pipe by means of the six stud bolts 33, as indicated in Figs. 9 and 10, the spider being free to move longitudinally of the pipe 24 to take care of any expansion and contraction in the two pipes incident to changes in temperature. In order to make a tight joint between the spider and the pipe 24, the packing 34 is employed (Fig. 9), such packing being tightened by means of the gland 35, which is threaded into the spider. It will be seen that the two pipes 24 and 29 are free to move longitudinally in the roll casing and also free to move relative to each other so that any tendency to buckle incident to differences in temperature is avoided. The distributing pipe 29 is provided with the series of perforations 36, permitting an outflow of water from the space between the pipes 24 and 29. This gives a distribution of the cooling fluid along the interior of the roll casing of such a character that the shell of the casing is uniformly cooled and any undue cooling at the center is avoided, such as would occur if the distributing pipe 29 were not used and all of the cooling fluid was discharged at the central portion of the casing through the passages 26. In order to give still further support for the central portion of the pipe 24 and reduce its tendency to sag, the members 37 are employed spaced at suitable intervals along the length of the two pipes. These members preferably consist of studs (Fig. 6) having their inner ends threaded into the pipe 24 and their outer ends resting against the inner surface of the pipe 29. The pipe 29 thus serves the double function of acting as a distributing and equalizing means and as a support for the pipe 24 tending to prevent any sagging or movement of such pipe from its position at the center of the roll casing. The two outlets 14 and 19 permit a regulation of the relative temperature at the two ends of the roll, since by throttling the outflow at one end, more water is caused to pass through to the other end, thus increasing the cooling effect at such other end. The use of a single inlet to the pipe 24 simplifies the structure, but the invention is not limited to the use of a supply pipe with a single inlet. Similarly, the roll is shown as counterbored to provide the chamber 9, but this counterboring is not an essential as is well-known in the art.

What I claim is:

1. In combination in a roll, an outer cylindrical casing, a liquid supply tube extending through the casing and discharging through the central portion thereof, such pipe being imperforate on each side of such central portion a second tube surrounding said supply tube and concentric therewith terminating short of the ends of said casing and provided with a series of perforations along its central portion, means for supplying a cooling fluid under pressure to the supply tube and means for withdrawing the fluid from the ends of the casing.

2. In combination in a roll, an outer cylindrical casing, a liquid supply tube extending through the casing and discharging through the central portion thereof, such pipe being imperforate on each side of such central portion a second tube surrounding said supply tube and concentric therewith terminating short of the ends of said casing and provided with a series of perforations along its central portion, means for supporting the supply tube from said second tube, means for supplying a cooling fluid under pressure to the supply tube and means for withdrawing the fluid from the ends of the casing.

3. In combination in a roll, an outer cylindrical casing, a liquid supply tube extending through the casing and discharging through the central portion thereof, a second tube of less length than the supply tube surrounding said supply tube and carrying means engaging the casing and serving to support both tubes from the casing, said second tube being provided with a series of perforations along its central portion, means for supplying a cooling fluid under pressure to the supply tube, and means for withdrawing the fluid from the ends of the casing.

4. In combination in a roll, an outer cylindrical casing, a liquid supply tube extending through the casing and discharging through the central portion thereof, a second tube of less length than the supply tube surrounding said supply tube and carrying means engaging the casing and serving to support both tubes from the casing, said second tube being provided with a series of perforations along its central portion, supporting means between the tubes at intervals therealong, means for supplying a cooling fluid under pressure to the supply tube, and means for withdrawing the fluid from the ends of the casing.

5. In combination in a roll, an outer cylindrical casing, a liquid supply tube extending through the casing and discharging through the central portion thereof, a second tube surrounding said supply tube and concentric therewith provided with a series of perforations along its central portion, means for supplying a cooling fluid under pressure to the supply tube, means for withdrawing the fluid from the ends of the casing, and means for supporting the tubes so that they are free to expand and contract independently of said casing.

6. In combination in a roll, an outer cylindrical casing, a liquid supply tube having one end closed and the other open extending through the casing and discharging through the central portion thereof, a second tube surrounding said supply tube concentric therewith having its ends closed and provided with a series of outlet perforations intermediate said ends, means for supplying a cooling fluid under pressure to the open end of said supply tube, and means for withdrawing the fluid from both ends of the casing.

7. In combination in a roll, an outer cylindrical casing, a liquid supply tube extending through the casing and discharging through the central portion thereof, a second tube of less length than the supply tube surrounding said supply tube and carrying means engaging the casing and serving to support both tubes from the casing at such points, said second tube being provided with a series of perforations along its central portion, means for supplying a cooling fluid under pressure to the supply tube, and means for withdrawing the fluid from the ends of the casing, said casing having its inner diameter reduced at the ends of said second tube where such tube is supported by the casing.

8. In combination in a roll, an outer cylindrical casing, a liquid supply tube extending through the casing and discharging through the central portion thereof, a second tube of less length than the supply tube surrounding said supply tube, a spider at each end of said second tube each comprising a plurality of arms engaging the inner surface of said casing and a collar fitting the space between the tubes and constituting a closure for such space, said second tube being provided with a series of perforations along its central portion, means for supplying a cooling fluid under pressure to the supply tube, and means for withdrawing the fluid from the ends of the casing.

In testimony whereof, I have hereunto subscribed my name this 27th day of Sept., 1927.

JOHN H. FOX.